United States Patent [19]  
Ito

[11] Patent Number: 4,920,433  
[45] Date of Patent: Apr. 24, 1990

[54] ROTARY RECORDING/PLAYBACK HEAD ANGULAR POSITION CORRECTION APPARATUS

[75] Inventor: Kenji Ito, Fukaya, Japan

[73] Assignee: Kabushiki Kaisha Toshiba, Kanagawa, Japan

[21] Appl. No.: 29,907

[22] Filed: Mar. 25, 1987

[30] Foreign Application Priority Data

Mar. 31, 1986 [JP] Japan ................... 61-72812

[51] Int. Cl.$^5$ ........................... G11B 15/14
[52] U.S. Cl. ...................... 360/64; 360/70; 360/77.12
[58] Field of Search ............... 360/64, 70, 75; 340/671; 318/561, 314, 600, 606

[56] References Cited

U.S. PATENT DOCUMENTS 4,361,856 11/1982 Okamoto ................. 360/64
4,630,136 12/1986 Ogawa ..................... 360/64
4,688,114 8/1987 Tokuyama .............. 360/70
4,695,781 9/1987 Ito ............................ 360/70 X
4,706,137 11/1987 Tanoka .................... 360/64
4,777,543 10/1988 Nishijima et al. ...... 360/70

Primary Examiner—Aristotelis M. Psitos  
Attorney, Agent, or Firm—Finnegan, Henderson, Farabow, Garrett and Dunner

[57] ABSTRACT

An angular position indicating signal generator for a data reproduction machine having a rotary element for recording and reproducing data including a reference signal having a predetermined delay time. The angular position indicating signal generator includes an angular position detection circuit for detecting the angular position of the rotary element relative to the rotary plane of the rotary element, a counter circuit for detecting the time difference between the rotary element and the reference signal, a memory circuit for storing the count of the counter circuit, and a delay circuit for automatically compensating the detected output of the angular position detection circuit in response to the count stored in the memory circuit.

11 Claims, 6 Drawing Sheets

ROTARY RECORDING/PLAYBACK HEAD ANGULAR POSITION CORRECTION APPARATUS

BACKGROUND OF THE INVENTION

1. Field of the Invention

The present invention relates to an angular position indicating signal generator for a rotary element of a data reproduction machine and, more particularly, to an angular position indicating signal generator for a rotary head apparatus of a video tape recorder (hereafter referred as VTR).

2. Description of the Prior Art

Generally, recording operations and playback operations of video signals in VTRs are carried out by a helical scanning system for a magnetic tape. In this helical scanning system, two rotary heads are rotatively provided in a rotary head apparatus, arranged 180° apart relative to the rotating axis of the rotary heads. The rotary head apparatus has a cylinder in which the rotary heads are coaxially supported and exposed at the outer surface of the cylinder. Thus, each rotary head scans the magnetic tape wound diagonally around the cylinder for an angle of 180°. The rotation speed of the rotary heads is controlled so that each rotary head scans one frame of the video signal.

In this way, in a helical scanning VTR system, the recording operations and playback operations of the video signal are shared by two rotary heads. Thus, for example, it is necessary to detect the angular positions of the rotary heads on a rotating plane of the rotary disc when recording or reproducing continuous signals which combine the video signals of each rotary head on predetermined locations of the magnetic tapes.

Referring now to FIG. 1, there is shown a prior art circuit for generating a signal indicative of the angular position of a rotary head relative to a rotating plane of the rotary head. In FIG. 1, a pair of first and second rotary heads 11a and 11b are provided on outer ends of a rotary disc 12 of a rotary head apparatus. The first and second rotary heads 11a and 11b are separated from each other by an angle of 180° relative to the rotating axis of the rotary disc 12. Also a pair of first and second position referencing magnets 13a and 13b are mounted on the rotary disc 12 corresponding to the first and second rotary heads 11a and 11b, respectively. The first and second position referencing magnets 13a and 13b are located on a circumference with the center of the rotating axis and precede the corresponding rotary heads 11a and 11b by angles $\theta a$ and $\theta b$ in the direction of rotation. The first and second position referencing magnets 13a and 13b are directed so that they generate magnetic fields of opposite polarity in the direction of the rotating axis. A magnetic field detection coil 14 is provided facing the circumference so that the first and second rotary heads 11a and 11b alternately face the magnetic field detection coil 14 during the rotation of the rotary disc 12. Thus, the magnetic field detection coil 14 generates a magnetic field detection signal S1 in response to the first and second position referencing magnets 13a and 13b. The magnetic field detection signal S1 includes first and second sinusoidal waveform pulses of opposite polarity, which alternately rise corresponding to the first and second position referencing magnets 13a and 13b, as shown in FIG. 2.

The magnetic field detection coil 14 is connected to a rectangular waveform shaping circuit, e.g., a Schmitt circuit 15. Thus, the detection signal S1 is applied to the Schmitt circuit 15 so that the detection signal S1 is converted to a rectangular waveform signal S2. The rectangular waveform signal S2 falls and rises according to the first and second sinusoidal waveform pulses in the detection signal S1, as shown in FIG. 2. The rectangular waveform signal S2 is applied in parallel to a pair of first and second adjustable delay circuits 16a and 16b directly, and indirectly through an inverter 17. The first and second adjustable delay circuits 16a and 16b are provided for decreasing the influence of discrepancies in the angles $\theta a$ and $\theta b$ from their standard angles, as described later.

The first and second adjustable delay circuits 16a and 16b are connected at their control terminals to first and second delay time adjusting circuits 18a and 18b, respectively. Each of the first and second delay time adjusting circuits 18a and 18b includes a variable resistor and a capacitor. Thus, the first and second adjustable delay circuits 16a and 16b generate first and second rectangular pulse signals S3 and S4, respectively. The first rectangular pulse signal S3 includes pulses with a first predetermined pulse width d1 corresponding to the rise of the rectangular waveform signal S2, as shown in FIG. 2. The second rectangular pulse signal S4 includes pulses with a second predetermined pulse width d2 corresponding to the fall of the rectangular waveform signal S2, as shown in FIG. 2.

Further, the first and second delay circuits 16a and 16b are connected at their output terminals to a set terminal S and a reset terminal R of a reset set flip-flop circuit (hereinafter referred as RS flip-flop circuit) 19, respectively. Thus, the RS flip-flop 19 generates a second rectangular waveform signal S5. The second rectangular waveform signal S5 falls and rises in correspondence with the trailing edges of the pulses in the first and second rectangular pulse signals S3 and S4, as shown in FIG. 2. The RS flip-flop circuit 19 is triggered by the first and second rectangular pulse signals S3 and S4 of the first and second adjustable delay circuits 16a and 16b. Thus, finally, an output signal H-SW which indicates the angular positions of the rotary heads 11a and 11b is obtained as an output of the RS flip-flop circuit 19. The angular position indicating signal, i.e., the output signal H-SW, is mainly used as a signal for switching outputs of the rotary heads 11a and 11b and for performing the recording or reproducing operations of video signals of the rotary heads 11a and 11b on predetermined locations of magnetic tapes.

The above described discrepancies of the angles $\theta a$ and $\theta b$ often arise in mass-produced VTR structures. In particular, these occur when the mounting accuracy of rotary heads 11a and 11b to the rotary disc 12 is inaccurate. Therefore, the first and second adjustable delay circuits 16a and 16b are installed for decreasing the discrepancies of the angles $\theta a$ and $\theta b$ by adjusting the pulse widths d1 and d2 in the first and second rectangular pulse signals S3 and S4.

Incidentally, of these first and second adjustable delay circuits 16a and 16b, the former is for use with first position referencing magnet 13a while the latter is for use with second position referencing magnet 13b.

The adjustment is carried out so that, at a specified time after the head switching signal, the vertical synchronous signal V of the video signal is recorded or reproduced. For example, in the VHS system, the vertical synchronous signal V is provided to be recorded or reproduced after the head switching phase with a delay time specified to a value between 5H–8H (H is the horizontal scanning period or one field period), and generally the delay time is adjusted at the center of the range, i.e., 6.5H. In fact, during the adjustment process in VTR manufacturing, a test tape (i.e., a reference tape) on which the vertical synchronous signal Vr is recorded at a specified position is reproduced, and the delay time is adjusted to the specified value while observing the time difference between the reproduced vertical synchronous signal Vr and the angular position indicating signal H-SW.

However, a variable resistor and a capacitor are required for adjustment in the above prior art angular position indicating signal generator for a rotary head apparatus of the VTR and, in addition, a considerably long time is required for the adjustment. For this reason, it has the drawback that the overall cost is high. Also, even if the adjustment of the variable resistor is automated by using a robot, there are difficulties from the aspect of adjustment accuracy. Moreover, randomness of adjustment occurs due to variations over time during use and variations in temperature characteristics.

Although variations or discrepancies of the angular position indicating signal H-SW due to variations or discrepancies in the angular differences of the angles $\theta a$ and $\theta b$ are compensated for in the prior art, as described above, installation parts for adjustment are required, it is difficult to automate the adjustment, and adjustment accuracy is affected by use over time, etc.

SUMMARY OF THE INVENTION

Accordingly, an object of the present invention is to provide an angular position indicating signal generator for a rotary element of a data reproduction machine which does not require outside parts for adjustment and is also suitable for automated adjustment.

Another object of the present invention is to provide an angular position indicating signal generator for a rotary element of a data reproduction machine which is not affected by variations due to use over time and can eliminate variations or discrepancies of the angular position indicating signals between one set and another due to mechanical inaccuracy.

In order to achieve the above objects, the angular position indicating signal generator for a rotary element of a data reproduction machine according to the present invention includes an angular position detection circuit for detecting the angular position of the rotary element relative to the rotary plane of the rotary element, a counter circuit for detecting the time difference between the rotary element and the reference signal, a memory circuit for storing the count of the counter circuit, and a delay circuit for automatically compensating the detection output of the angular position detection circuit in response to the count stored in the memory circuit.

DESCRIPTION OF THE PREFERRED EMBODIMENTS

Figure 1:
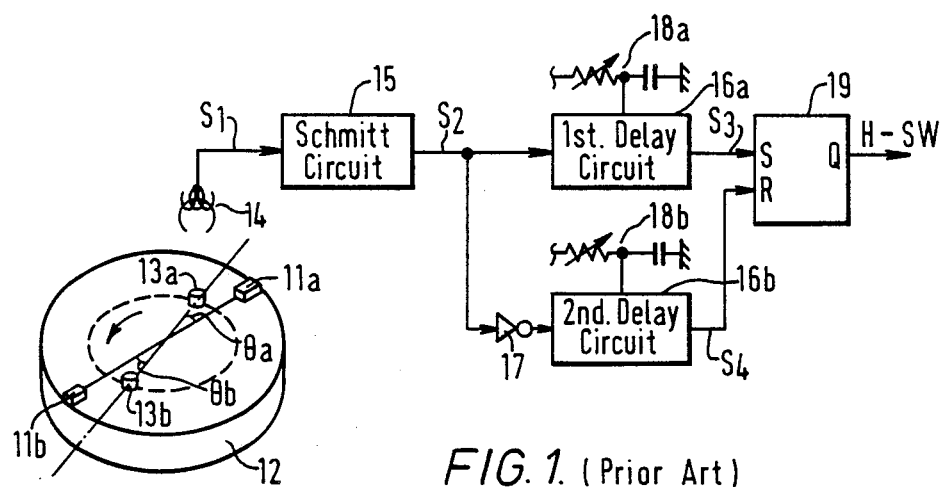
FIG. 1 is a schematic diagram generally showing the operating components of a prior art angular position indicating signal generator for rotary heads of a VTR.
Figure 2:
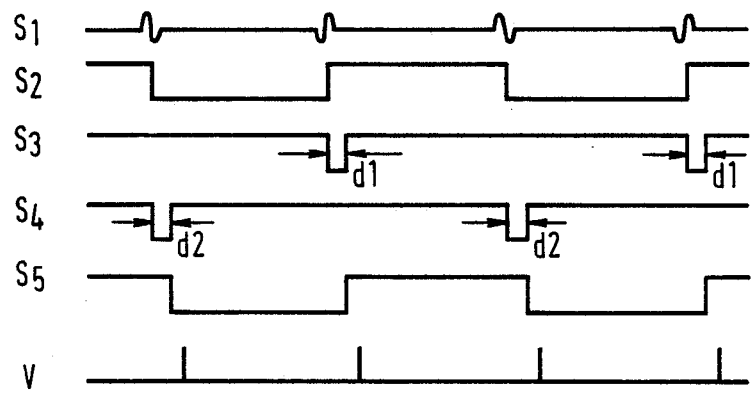
FIG. 2 is a timing chart illustrating the operation of the device of FIG. 1.
Figure 4:
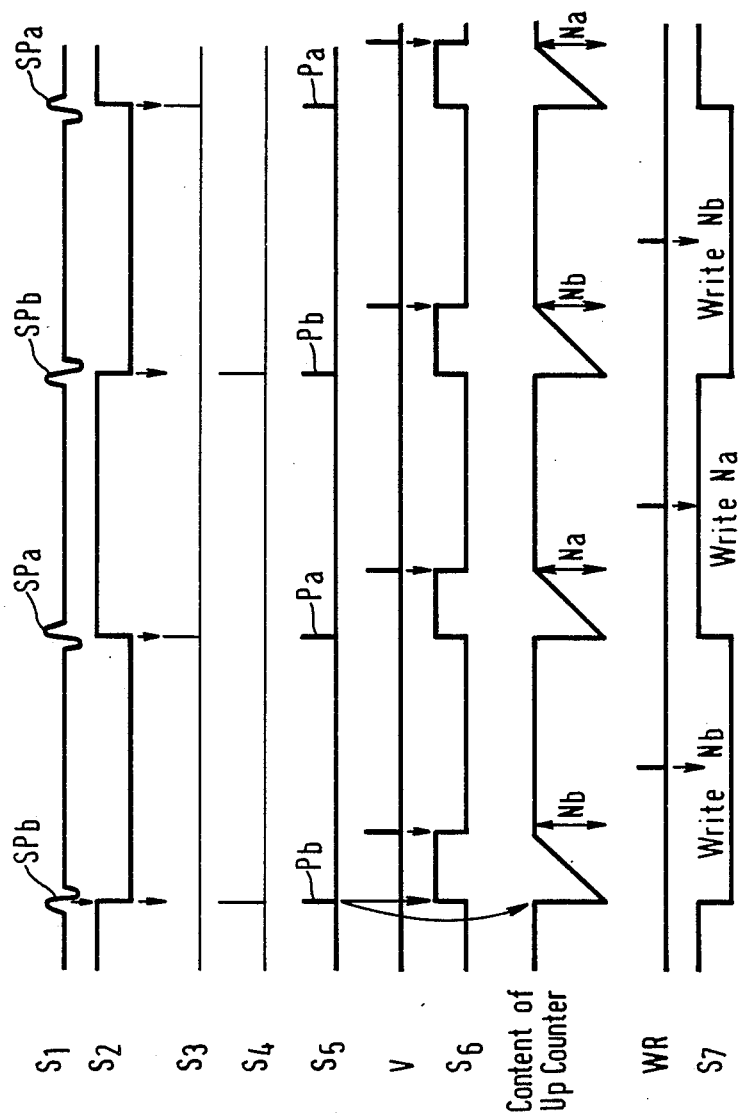
FIGS. 4 and 5 are timing charts illustrating the operation of the embodiment shown in FIG. 3.
Figure 5:
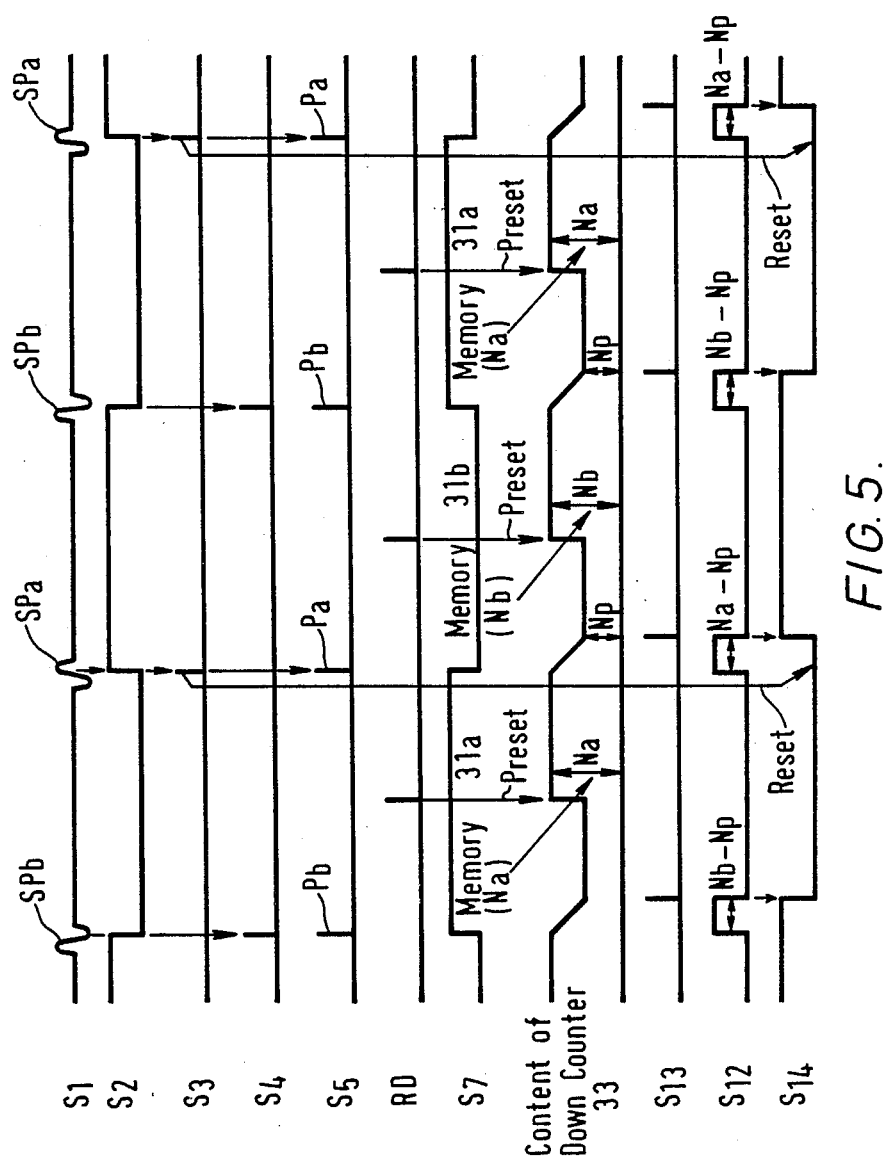

The present invention will now be described in detail with reference to the accompanying drawings, namely, FIGS. 3 to 5. Throughout the drawings, like reference numerals and letters are used to designate elements like or equivalent to those used in FIG. 1 (Prior Art Apparatus) for the sake of simplicity of explanation.

Broadly stated, the present invention is an angular position indicating signal generator for a rotary element of a data reproduction machine having an angular position detector responsive to the heads for generating an angular position indicating signal of the heads relative to a rotary plane of the heads, a counting means for detecting a time difference between the angular position indicating signal for the rotary heads and a predetermined reference signal, a memory means for storing the count data of the time difference, and a delay means for automatically compensating for the time difference in response to a predetermined preset data.

Figure 3:
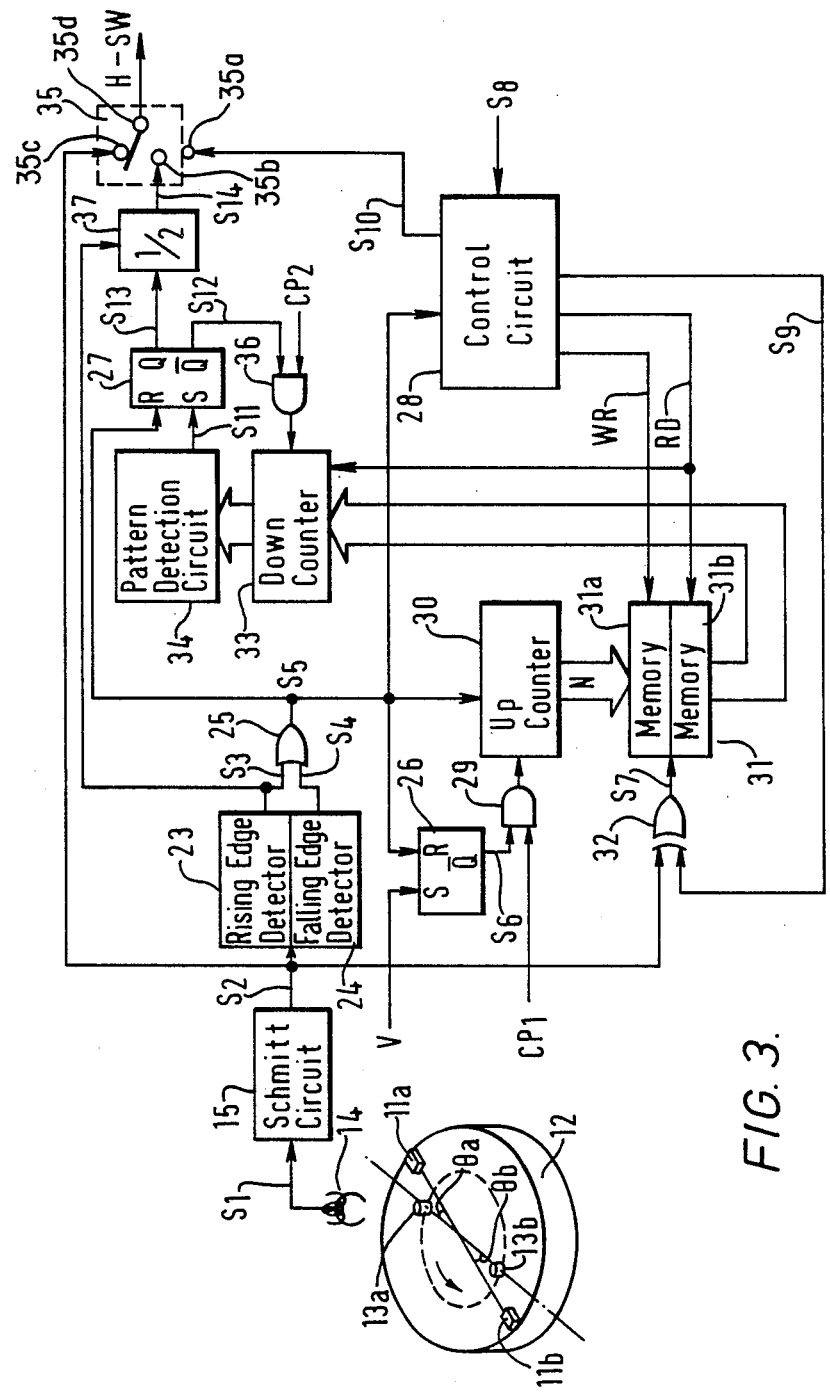
FIG. 3 is a schematic diagram showing the general composition of an embodiment of this invention.

Referring now to FIG. 3, an embodiment of the present invention will be explained in detail. In FIG. 3, a pair of first and second rotary elements, i.e., rotary heads 11a and 11b, are provided on outer ends of a rotary disc 12 of a rotary head apparatus. The first and second rotary heads 11a and 11b are separated from each other by an angle of 180° relative to the rotating axis of the rotary disc 12. A pair of first and second position referencing magnets 13a and 13b are mounted on the rotary disc 12 corresponding to the first and second heads 11a and 11b, respectively. The first and second position referencing magnets 13a and 13b are located on a circumference with the center of the rotating axis and precede the corresponding rotary heads 11a and 11b by angles $\theta a$ and $\theta b$ in the direction of rotation. The first and second position referencing magnets 13a and 13b are directed so that they generate magnetic fields of opposite polarity in the direction of the rotating axis. A magnetic field detection coil 14 is provided facing the circumference so that the first and second rotary heads 11a and 11b alternately face to the magnetic field detection coil 14 during the rotation of the rotary disc 12. Thus, the magnetic field detection coil 14 generates a magnetic field detection signal S1 in response to the first and second position referencing magnets 13a and 13b. The magnetic field detection signal S1 includes first and second sinusoidal waveform pulses SPa and SPb of opposite polarity, which alternately arise in correspondence to the first and second position referencing magnets 13a and 13b, as shown in FIG. 4.

The magnetic field detection coil 14 is connected to a waveform shaping circuit, e.g. a Schmitt circuit 15. Thus, the magnetic field detection signal S1 is shaped by the Schmitt circuit 15 and converted to a rectangular waveform signal S2. The rectangular waveform signal S2 falls and rises in correspondence to the first and second sinusoidal waveform pulses SPa and SPb in the magnetic field detection signal S1, as shown in FIG. 4. The rising edges of the rectangular waveform signal S2 are detected by a rising edge detector 23, while the falling edges are detected by a falling edge detector 24. Thus, a rising edge indicating signal S3 and a falling edge indicating signal S4, as shown in FIG. 4, are obtained in response to the first and second sinusoidal waveform pulses SPa and SPb of the magnetic field detection signal S1, respectively. The logical sum is taken from the rising edge indicating signal S3 and the falling edge indicating signal S4 by an OR gate 25, and the logical sum is outputted as a combined rising and falling edge indicating signal S5, as shown in FIG. 4. The combined rising and falling edge indicating signal S5 includes pulses Pa and Pb which correspond to the the first and second sinusoidal waveform pulses SPa and SPb of the magnetic field detection signal S1, respectively. The combined rising and falling edge indicating signal S5 also has a frequency two times higher than the frequency of the rectangular waveform signal S2.

The combined rising and falling edge indicating signal S5 is applied to the reset terminals of first and second RS flip-flop circuits 26 and 27 and also to a control circuit 28. A reference signal, e.g., a vertical synchronous signal Vr which is reproduced by the rotary heads 11a and 11b from a test tape for adjustment, is applied to the set terminal of the first RS flip-flop circuit 26. An inverted output S6 of the first RS flip-flop circuit 26 is applied to one of the inputs to a first AND gate 29. The other input of the first AND gate 29 is supplied with a first clock signal CP1. The output of the first AND gate 29 is applied to a clock terminal of an up counter 30. By this form of connection, the up counter 30 is reset by the pulses Pa and Pb of the rising and falling edge indicating signal S5, and then it counts the first clock signal CP1. In other words, the up counter 30 starts its counting operation each time the pulses Pa and Pb are received. The up counter 30 stops its count operation and holds a count value Na or Nb until the reproduced vertical synchronous signal Vr is received. The count values Na and Nb are equivalent to the time differences between the first and second sinusoidal waveform pulses SPa and SPb of the magnetic field detection signal S1 and the reproduced vertical synchronous signal Vr.

The content Na or Nb of the up counter 30 is applied to the input terminal of a memory circuit 31. The memory circuit 31 includes two memories 31a and 31b, respectively, corresponding to the rotary heads 11a and 11b. One or the other of the memories 31a and 31b is selected by a memory selection signal S7, which will be described later. Thus, the counts Na and Nb are stored in the memories 31a and 31b, respectively. The control circuit 28 is supplied with the combined rising and falling edge indicating signal S5 and an adjustment mode command signal S8 of high level, and the control circuit 28 outputs multiple control signals. First, the control circuit 28 controls the memory circuit 31 by supplying a first control signal, i.e., a "write" pulse WR, as shown in FIG. 4, and a second control signal, i.e., a "read" pulse RD, as shown in FIG. 5. The "write" pulse WR is supplied in the operation of the adjustment mode, while the "read" pulse RD is supplied in the operation of normal use modes other than the adjustment mode, e.g., the practical operation mode. Also, the control circuit 28 supplies a third control signal S9 whose polarity changes according to whether the VTR is in the adjustment mode or the normal use mode. The exclusive logical sum of the third control signal S9 and the first rectangular waveform signal S2 is taken by an exclusive OR circuit 32. The exclusive logical sum is outputted as the memory selection signal S7, as shown in FIG. 4. Furthermore, the control circuit 28 supplies a fourth control signal S10 for a control terminal 35a of a switch 35.

The "read" output Na or Nb of the memory circuit 31 is fed to a down counter 33 as a preset data, and the "read" pulse RD is applied to the preset terminal of the down counter 33. The output of the down counter 33 is applied to a pattern detection circuit 34. The pattern detection circuit 34 is preset to a prescribed pattern data Np which corresponds to the prescribed preset delay data, e.g., 6.5H, as described above. Thus, the pattern detection circuit 34 outputs its output S11 when the content of the down counter 33 reaches the prescribed pattern data Np. The output S11 of the pattern detection circuit 34 is applied to a set terminal of the second RS flip-flop circuit 27. The second RS flip-flop circuit 27 applies an inverted output S12 to one input of a second AND gate 36. The other input of the second AND gate 36 is supplied with a second clock signal CP2, and the output of the second AND gate 36 is applied to the clock terminal of the down counter 33. By this form of connection, the down counter 33 commences counting down the the preset data, i.e. the "read" output Na or Nb from the memory circuit 31, at both rising and falling edges of the rectangular waveform signal S2, and continues the down counting of the second clock signal CP2 until the count content of the down counter 33 reaches the prescribed pattern data Np in the pattern detection circuit 34. Therefore, the clock count of the down counter 33 becomes the difference between the preset data Na (or Nb) and the prescribed pattern data Np, i.e., Na−Np (or Nb−Np). The rising edge of the non-inverted output S13 of the second RS flip-flop circuit 27 delays by the difference Na−Np (or Nb−Np) from the rising edge or the falling edge of the rectangular waveform angular position indicating signal S2. The frequency of the non-inverted output S13 is halved by a divider 37. Moreover, the phase of the frequency division output S14 from the divider 37 is determined in response to or by resetting due to the rising edge indicating signal S3. Thus, the output S14 of the divider 37 is restored to the frequency of the rectangular waveform signal S2. The output S14 of the divider 37 is supplied to the first selectable contact 35b of the switch 35. The rectangular waveform signal S2 is fed to the second selectable contact 35c of the switch 35. An output signal obtained on the movable contact 35d of the switch 35 becomes the angular position indicating signal H-SW with the prescribed delay time.

The operation of the structure described above is explained below in detail further with reference to FIGS. 4 and 5

First, in the adjustment mode shown in FIG. 3, the control circuit 28 enters the control operation for the adjustment mode when the "adjustment mode" command signal S8 is applied thereto. In response to the command signal S8, the control circuit 28 applies the fourth control signal S10 to the control terminal 35a of the switch 35. In the switch 35, the movable contact 35d is then coupled to the second selectable contact 35c. Thus, the rectangular waveform signal S2 from the Schmitt circuit 22 is directly led out as the angular position indicating signal H-SW, without the delay operation being carried out. In this condition, the test tape is reproduced by rotating the rotary disc 12. When the phase lock condition is reached, control circuit 28 generates the "write" pulse WR at a suitable delay time from the pulses Pa and Pb of the combined rising and falling edge indicating signal S5, as shown in FIG. 4. Also at this time, the third control signal S9 is "0". Here it is assumed that the memory 31a is accessed when the memory selection signal S7 is "1", while the memory 31b is accessed when the memory selection signal S7 is "0", as shown in FIG. 4. The count data Na, which corresponds to the time from the pulse Pa of the combined rising and falling edge indicating signal S5 to the reproduced vertical synchronous signal Vr, is written to the memory 31a while the count data Nb, which corresponds to the time from the pulse Pb of the combined rising and falling edge indicating signal S5 to the reproduced vertical synchronous signal Vr, is written to the memory 31b. By this series of operations, the count data Na, which corresponds to the angle $\theta a$ between the first position referencing magnet 13a and the first rotary head 11a, and the count data Nb, which corresponds to the angle $\theta b$ between the second position referencing magnet 13b and the second rotary head 11b, are stored in the memories 31a and 31b, respectively. Thus, the automatic adjustment is completed.

Next, an operation for a normal use mode other than the adjustment mode will be explained with reference to FIG. 5. In the normal use mode, the "adjustment mode" command signal S8 for the control circuit is at a low level. Then, the control circuit 28 outputs the fourth control signal S10 so that the switch 35 selects the signal S14. That is, the movable contact 35d is coupled to the first selectable contact 35b. Also, as shown in FIG. 5, the "read" pulse RD is generated at a suitable delay time from the pulses Pa and Pb of the combined rising and falling edge indicating signal S5. Furthermore, the third signal S9 becomes "1" and the memory selection polarity is reversed relative to the polarity at the adjustment mode. In other words, the content Nb of the memory 31b is read in the period when the rectangular waveform signal S2 is "1", while the content Na of the memory 31a is read in the period when the rectangular waveform signal S2 is "0". Thus, the content Na of the memory 31a is preset in the down counter 33 in response to the pulse Pa of the combined rising and falling edge indicating signal S5. The output of S14 of the divider 37, thus, rises after the time corresponding to the count Na−Np of the down counter 33. The content Nb of the memory 31a is preset in the down counter 33 in response to the pulse Pb of the combined rising and falling edge indicating signal S5. The signal S14 outputted from the divider 37 thus falls after the time corresponding to the count Nb−Np of the down counter 33. Now, as the preset pattern data Np in the pattern detection circuit 34 has been set to the value corresponding to the specified delay time, e.g., 6.5H before the vertical synchronous signal Vr of the test tape, as described above, vertical synchronous signals Vn in the normal use mode are recorded or reproduced in exactly the same position as the vertical synchronous signal Vr on the test tape.

Preferably, in the above embodiment, the memory circuit 31 comprises a non-volatile type memory which holds the count data Na and Nb for a long period. Further, a completely automatic adjustment can be performed by stopping the application of the adjustment mode command signal S8 to the control circuit 28, when the writing of the count data Na and Nb into the memory circuit 31 has been completed. This is done by using a signal which is generated in response to the completion of the writing of the count data Na and Nb into the memory circuit 31 and applied to suitable circuit for stopping the application of the adjustment mode command signal S8 to the control signal 28.

The angular position indicating signal, or the rotary head switching signal H-SW, can be used for a servo control of the rotation of the rotary disc 11. In this case, the accuracy of the servo control depends on the accuracy of the second clock signal CP2 applied for the down counter 33. Thus, it is preferred that the second clock signal CP2 have a relatively high frequency. On the other hand, the first clock signal CP1 for the up counter 30 is merely used to determine the prescribed delay time, e.g., 6.5H. However, in the VHS system, the prescribed delay time is allowed to take another value in the range of 5.0H to 8.0H, as mentioned above. Therefore, the accuracy of the first clock signal CP1 can be inferior to that of the second clock signal CP2.

In the embodiment described above, the angular position indicating signal generator for the rotary heads of the VTRs is comprised of digitized circuit components except the Schmitt circuit 15. However, the rectangular waveform shaping circuit itself can be made by a digitized system. Thus, the angular position indicating signal generator for the rotary element of the data reproducing machines does not require a variable resistor or capacitor. Further, the number of externally mounted parts is small. Thus, the production of a highly integrated circuit is possible. Also, by digitization, the circuits are not easily susceptible to the influences of aging and temperature changes and, furthermore, since there is automatic processing for all circuits, adjustment becomes easier.

Incidentally, it is also possible to apply this invention to systems in which the angular position indicating signal or the rotary element switching signal H-SW is determined to a 180° phase difference by dividing speed control signals which are multiple pulses generated for one rotation of the rotary disc. Also, it is applicable to the case of digitally producing a 180° phase difference signal. In these cases, one memory is sufficient.

According to the present invention as described above, an angular position indicating signal generator for a rotary element of the data reproducing machines can be provided in which there are no externally mounted parts such as variable resistors and capacitors, in which automation of adjustment is easy, and in which high accuracy without any substantial variations or discrepancies can be obtained.

As described above, the present invention can provide an extremely preferable angular position indicating signal generator for a rotary element of the data reproducing machines which can automatically adjust the delay time of the angular position indicating signal for rotary element.

While presently preferred embodiments of the present invention have been illustrated and described, it will be understood by those skilled in the art that various changes and modifications may be made, and equivalents may be substituted for elements thereof, without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A rotary recording/playback head angular position correction apparatus for outputting an angular position indicating signal in a data reproduction machine having a rotary head element rotatably positioned in a rotary plane for reproducing data, the data including a reference signal, said apparatus including:

angular position detection means for producing a detection signal in response to detection of an angular position of the rotary head element;

counting means operatively coupled to said rotary head element and to said angular position detection means for measuring a time difference between receipt of the detection signal and receipt of the reference signal;

memory means operatively coupled to said counting means for storing the time difference; and adjustment means operatively coupled to said memory means for generating and outputting the angular position indicating signal in accordance with the time difference.

2. The apparatus of claim 1, wherein the adjustment means includes:

a reverse counter operatively coupled to said memory means for counting down from the time difference to generate a reverse count value;

a pattern detection circuit operatively coupled to said reverse counter for comparing the reverse count value with a predetermined value to produce the angular position indicating signal; and logic circuit means operatively coupled to said angular position detection means and to said pattern detection circuit for selectively outputting the angular position indicating signal in accordance with the detection signal.

3. The apparatus of claim 2, wherein the logic circuit means includes a second flip-flop responsive to the detection signal for selectively outputting the angular position indicating signal, and a frequency divider coupled to the second flip-flop and to the angular position detection means for dividing the frequency of the angular position indicating signal.

4. The apparatus of claim 1, wherein the counting means includes a first flip-flop circuit responsive to the detection signal and an AND gate coupled to the first flip-flop circuit for receiving the output of the first flip-flop circuit.

5. The apparatus of claim 4, wherein the first flip-flop is responsive to the reference signal.

6. The apparatus of claim 5, wherein the reference signal comprises a vertical synchronous signal.

7. The apparatus of claim 1, wherein the angular position detection means includes means for detecting a rotation of the rotary head element and generating the detection signal, rectangular waveform shaping means responsive to said rotation detecting means for shaping the detection signal into a rectangular wave, and edge detection means coupled to said rectangular waveform shaping means for detecting the rise and fall of the rectangular wave.

8. A rotary recording/playback head angular position correction apparatus for outputting an angular position indicating signal in a video tape recorder having rotary heads, the rotary heads reproducing a vertical synchronous signal, said apparatus comprising:

angular position detection means for producing a detection signal in accordance with the angular position of the rotary heads;

counting means operatively coupled to the rotary heads and to said angular position detection means for measuring a time difference between receipt of the vertical synchronous signal and receipt of the detection signal;

memory means operatively coupled to said counting means for storing the time difference; and adjustment means operatively coupled to said memory means for generating and outputting the angular position indicating signal in accordance with the time difference.

9. The apparatus of claim 8, wherein the adjustment means includes:

a reverse counter operatively coupled to said memory means for counting down from the time difference to generate a reverse count value;

a pattern detection circuit operatively coupled to said reverse counter for comparing the reverse count value with a predetermined value to produce the angular position indicating signal; and logic circuit means operatively coupled to said angular position detection means and to said pattern detection circuit for selectively outputting the angular position indicating signal in response to the detection signal.

10. A rotary recording/playback head angular position correction apparatus for outputting an angular position indicating signal in a data reproduction machine having a rotary head element with two opposed heads rotatably positioned in a rotary plane for reproducing data, the data including a reference signal, said apparatus comprising:

angular position detection means for producing a detection signal in response to detection of the angular position of the rotary heads;

counting means operatively coupled to said rotary head element and to said angular position detection means for measuring a time difference between receipt of the detection signal and receipt of the reference signal;

memory means operatively coupled to said counting means for storing the time difference;

control means operatively coupled to said memory means for controlling said memory means to selectively store the time difference during an adjustment mode lasting for at least one revolution of the heads and to selectively output the time difference during a normal use mode; and adjustment means operatively coupled to said memory means for generating and outputting the angular position indicating signal in accordance with the time difference.

11. The apparatus of claim 10, wherein the adjustment means includes:

a reverse counter operatively coupled to said memory means for counting down from the time difference to generate a reverse count value;

a pattern detection circuit operatively coupled to said reverse counter for comparing the reverse count value with a predetermined value to produce the angular position indicating signal; and logic circuit means operatively coupled to said angular position detection means and to said pattern detection circuit for selectively outputting the angular position indicating signal in response to the detection signal.

* * * * *